UNITED STATES PATENT OFFICE.

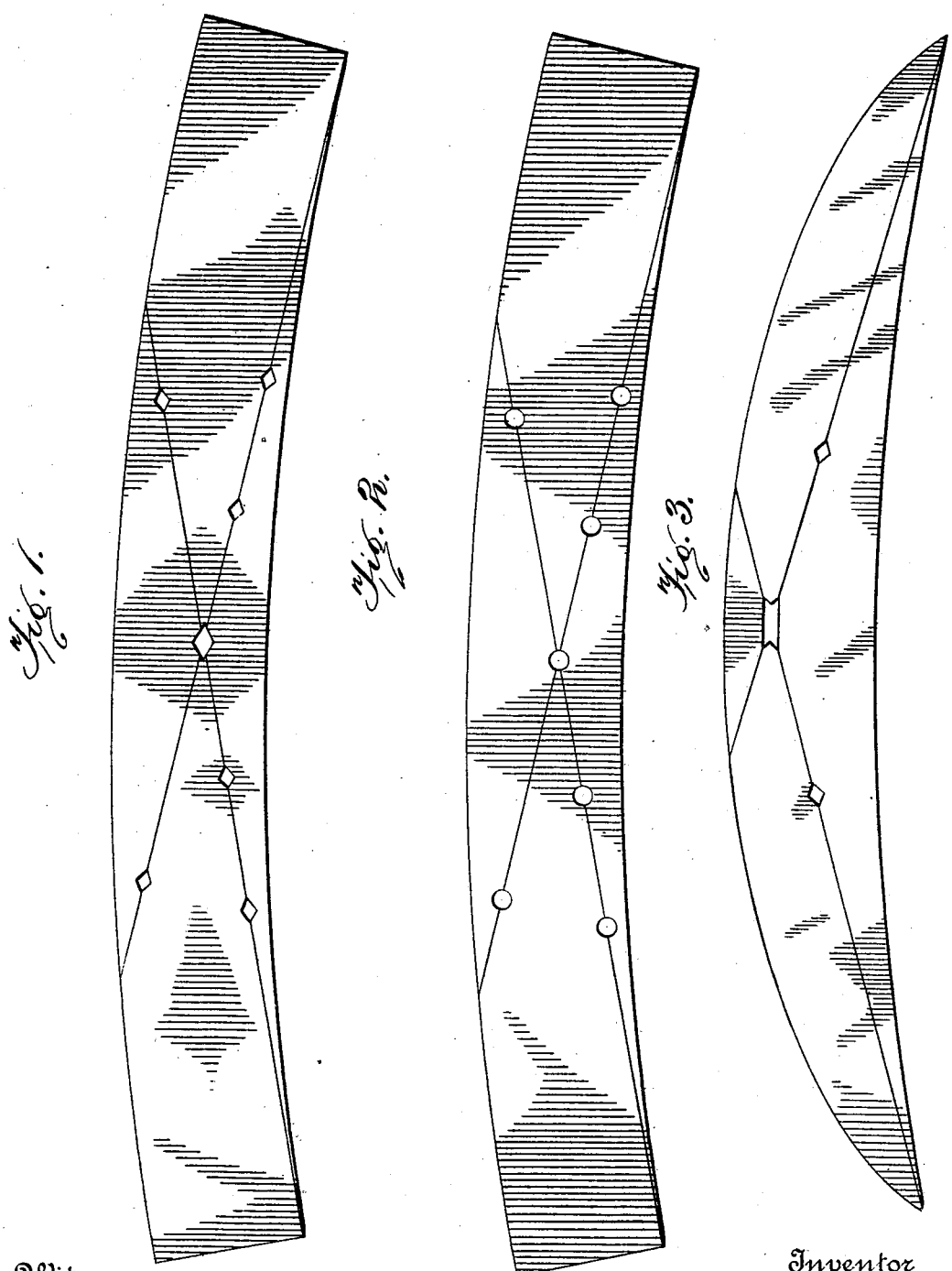

HENRY A. SWENSON, OF LINDSTROM, MINNESOTA.

DRAWING-CURVE MADE OF CARDBOARD, &c.

SPECIFICATION forming part of Letters Patent No. 669,270, dated March 5, 1901.

Application filed February 20, 1900. Serial No. 5,871. (No model.)

*To all whom it may concern:*

Be it known that I, HENRY A. SWENSON, residing at Lindstrom, in the county of Chisago and State of Minnesota, have invented certain new and useful Improvements in Drawing Implements, of which the following is a specification, reference being had therein to the accompanying drawings.

The invention relates to implements for drawing or otherwise producing curves or curved lines.

The object of the invention is to produce a curved rule or guide which shall accurately indicate the direction of a curve from a straight-line base and enable the draftsman to mark or produce such curve, if desirable.

Figure 1 is a plan of a curved rule involving my invention. Fig. 2 is a modification of the same, showing perforations of different form. Fig. 3 is a modification showing the rule with different curves.

The implement may be made of wood, paper, pasteboard, celluloid, rubber, metal, or other material in the form of a flat plate. Both edges are on curves preferably struck from the same center, but not necessarily so.

One face of the instrument is ruled with lines tangent to the interior curve. The tangent lines should be struck from the ends and extend to the other side of the implement. The lines will thus cross at the center. The implement can then be used at either hand. At the center and elsewhere along the tangent lines perforations are made as large, as numerous, and of such form as may be desirable. Holes of square or diamond shape, with opposite angles on the tangent lines, are quite convenient for the purpose. By laying the implement on any straight line on a drawing or plat, with such line in the line of a tangent line on the instrument and visible through the openings in the rule, the curve of the rule to which said line is tangent may be immediately produced by marking or otherwise on the drawing.

The implement is applicable to a variety of uses. For instance, by applying the implement from both ends of the curve on a drawing and then uniting the curves drawn an effective length up to three times the actual length of the implement is secured. A tangent can be laid off by marking through perforations from any point on the circumference, and from the tangent the radius may readily be found.

I am aware that drafting implements, and especially protractors, have been made from transparent or translucent material, through which lines of drawings might be seen, the face of the instrument having lines and index. Such an instrument differs materially from mine, wherein opaque material is used, a tangent line and a curve are the base of calculation, and the instrument is available for use as a ruler.

What I claim is—

1. A drafting implement having a curved edge, a line drawn on said instrument tangent to the curve, and a perforation through the instrument through which a base-line may be seen.

2. A drafting implement having a curved edge, lines tangent to said edge extending in opposite directions, and perforations along said lines.

3. A drafting implement having a curved edge, a line tangent to said edge, and perforations on said line with opposite angles on the tangent line, substantially as described.

4. In a drafting implement, the body portion having its edges on different curves, a surface line tangent to one of the curves, and perforations along said tangent line, substantially as described.

HENRY A. SWENSON.

Witnesses:
CHARLES J. A. MORRIS,
JAMES D. ARMSTRONG.